US009525484B2

(12) United States Patent
Brouillet

(10) Patent No.: US 9,525,484 B2
(45) Date of Patent: *Dec. 20, 2016

(54) PHOTO-SENSOR ARRAY TO ADJUST ALIGNMENT OF OPTICAL RECEIVER

(71) Applicant: Google Inc., Mountain View, CA (US)

(72) Inventor: Jeremy Brouillet, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,875

(22) Filed: Jul. 9, 2015

(65) Prior Publication Data
US 2015/0326313 A1    Nov. 12, 2015

Related U.S. Application Data

(63) Continuation of application No. 13/618,365, filed on Sep. 14, 2012, now Pat. No. 9,106,336.

(51) Int. Cl.
| | |
|---|---|
| *H04B 10/00* | (2013.01) |
| *H04B 10/11* | (2013.01) |
| *H04B 10/114* | (2013.01) |
| *H04B 10/112* | (2013.01) |
| *H04B 10/60* | (2013.01) |

(52) U.S. Cl.
CPC ........... *H04B 10/11* (2013.01); *H04B 10/1125* (2013.01); *H04B 10/1129* (2013.01); *H04B 10/1143* (2013.01); *H04B 10/60* (2013.01)

(58) Field of Classification Search
CPC ..... B60L 8/00; G02B 6/2793; H04B 7/18576; H04B 7/18504; H04B 10/22; H04B 10/118
USPC .......................................... 398/131, 128, 12
See application file for complete search history.

(56) References Cited

U.S. PATENT DOCUMENTS

| | | | | |
|---|---|---|---|---|
| 5,471,248 A | * | 11/1995 | Bhargava | H04N 19/503 375/240.24 |
| 6,504,976 B1 | * | 1/2003 | Polynkin | G01J 3/2803 385/15 |
| 7,046,934 B2 | * | 5/2006 | Badesha | B64B 1/50 398/121 |

(Continued)

FOREIGN PATENT DOCUMENTS

WO    2012109248    8/2012

OTHER PUBLICATIONS

Dayong Zhou, Control Algorithm Development for Mobile FSO Node Alignment, School of Electrical and Computer Engineering, University of Oklahoma, IEEE, 2009.

*Primary Examiner* — David Payne
*Assistant Examiner* — Pranesh Barua
(74) *Attorney, Agent, or Firm* — McDonnell Boehnen Hulbert & Berghoff LLP

(57) ABSTRACT

In the context of a balloon network, embodiments described herein may help to maintain an optical communications link between two balloons. For example, an illustrative balloon may include auxiliary photodetectors that are arranged around the photodetector in the balloon's optical receiver system. The balloon may detect intensity differences between the auxiliary photodetectors on opposite sides of an optical receiver, and adjust the positioning in an effort to reduce the intensity difference, and by so doing, better align the optical receiver with the optical transmitter of the transmitting balloon.

20 Claims, 10 Drawing Sheets

(56) References Cited

U.S. PATENT DOCUMENTS

| | | | |
|---|---|---|---|
| 7,269,321 B2* | 9/2007 | Morris | G02B 6/43 385/115 |
| 7,653,108 B2* | 1/2010 | Morris | H01S 5/4025 372/50.12 |
| 7,711,441 B2* | 5/2010 | Tillotson | B60L 8/00 136/246 |
| 2002/0072361 A1* | 6/2002 | Knoblach | H04B 7/18576 455/431 |
| 2002/0167702 A1* | 11/2002 | Badesha | B64B 1/50 398/121 |
| 2007/0112705 A1 | 5/2007 | Mardirossian | |
| 2007/0127008 A1 | 6/2007 | Ash | |
| 2007/0263963 A1* | 11/2007 | Hughes | G02B 26/0891 385/90 |
| 2009/0184237 A1* | 7/2009 | Suzuki | G01J 1/46 250/208.1 |
| 2010/0001950 A1* | 1/2010 | Fouquet | G06F 3/0312 345/156 |
| 2011/0157584 A1* | 6/2011 | Lin | G01J 1/16 356/243.1 |
| 2011/0170391 A1* | 7/2011 | Ross | G11B 7/131 369/53.26 |

\* cited by examiner

PHOTO-SENSOR ARRAY TO ADJUST ALIGNMENT OF OPTICAL RECEIVER

CROSS REFERENCE TO RELATED APPLICATIONS

This application claims priority to U.S. patent application Ser. No. 13/618,365, filed Sep. 14, 2012, entitled "Photo-sensor Array to Adjust Alignment of Optical Receiver", now pending, the contents of which are incorporated by reference herein for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a balloon system includes: (i) an optical receiver configured to receive an optical signal at a balloon; (ii) a plurality of alignment sensors comprising at least a first and a second alignment sensors, wherein the first and the second alignment sensors are positioned so as to detect the optical signal at a first and a second location, respectively, and wherein the first location and the second location are proximate to opposite sides of the optical receiver; and (iii) a control system configured to: (a) receive first light data that is indicative of the optical signal as received at the first alignment sensor; (b) receive second light data that is indicative of the optical signal as received at the second alignment sensor; (c) analyze the first and second light data to detect an intensity difference between the optical signal as received at the first alignment sensor and the optical signal as received at the second alignment sensor; and (iv) in response to detection of the intensity difference, initiate a process to control positioning of the optical receiver based on the intensity difference.

In another aspect, a computer-implemented method involves: (i) receiving first light data that is indicative of an optical signal as received at a first of a plurality of alignment sensors, wherein the plurality of alignment sensors comprises at least the first and a second alignment sensor, wherein the first and the second alignment sensor are positioned so as to detect the optical signal at a first and a second location, respectively, and wherein the first location and the second location are proximate to opposite sides of an optical receiver of a balloon; (ii) receiving second light data that is indicative of the optical signal as detected at the second alignment sensor; (iii) analyzing the first and second light data to determine an intensity difference exists between: (a) the optical signal as detected at the first alignment sensor and (b) the optical signal as detected at the second alignment sensor; and (iv) in response to detecting the intensity difference, positioning the optical receiver based on the intensity difference.

In another aspect, non-transitory computer readable medium has stored therein instructions that are executable by a computing device to cause the computing device to perform functions including: (i) receiving first light data that is indicative of an optical signal as received at a first of a plurality of alignment sensors, wherein the plurality of alignment sensors comprises at least the first and a second alignment sensor, wherein the first and the second alignment sensor are positioned so as to detect the optical signal at a first and a second location, respectively, and wherein the first location and the second location are proximate to opposite sides of an optical receiver of a balloon; (ii) receiving second light data that is indicative of the optical signal as detected at the second alignment sensor; (iii) analyzing the first and second light data to determine an intensity difference exists between: (a) the optical signal as detected at the first alignment sensor and (b) the optical signal as detected at the second alignment sensor; and (iv) in response to detecting the intensity difference, positioning the optical receiver based on the intensity difference.

These as well as other aspects, advantages, and alternatives, will become apparent to those of ordinary skill in the art by reading the following detailed description, with reference where appropriate to the accompanying drawings.

DETAILED DESCRIPTION

Figure 1:
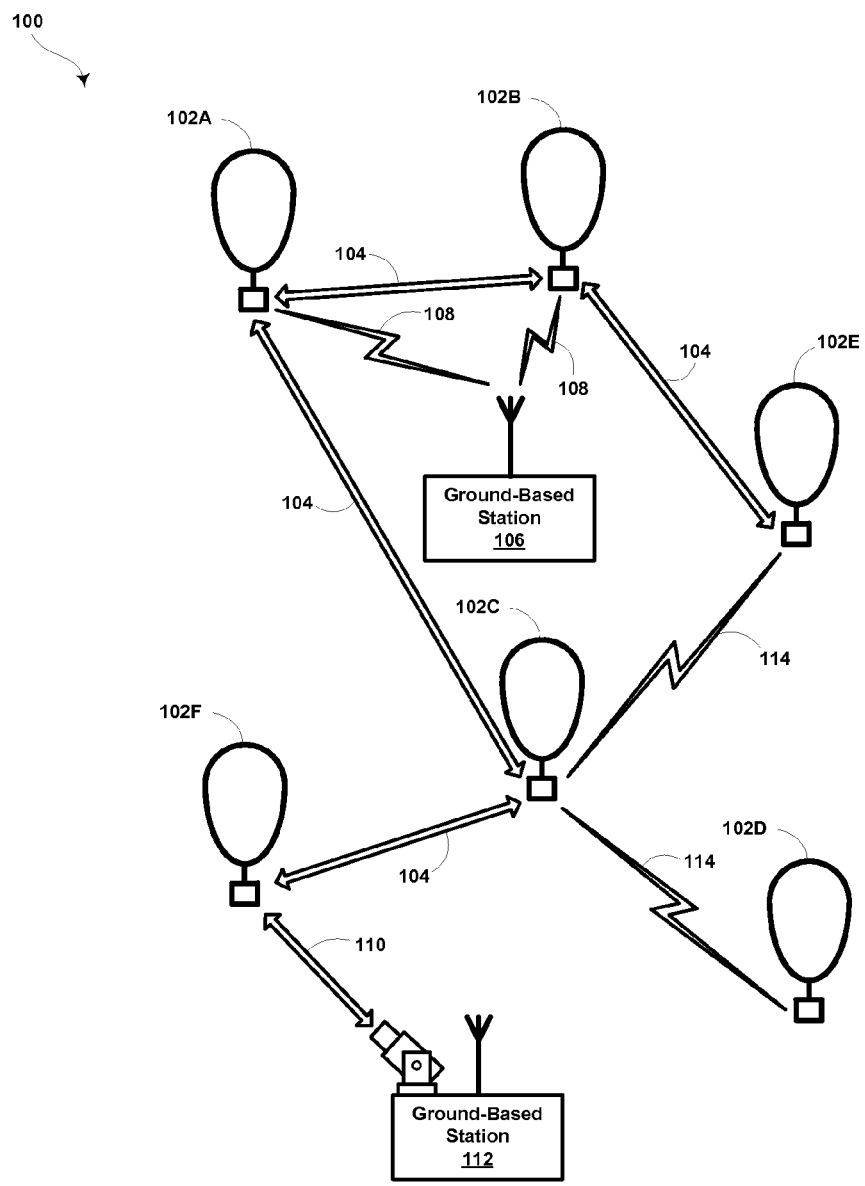
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. OVERVIEW

Illustrative embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For example, balloon-to-balloon free-space optical links may be implemented using lasers. As another example, balloons may be configured for optical communications using ultra-bright LEDs (which are also referred to as "high-power" or "high-output" LEDs). In addition, the balloons may communicate with ground-based station(s) using radio-frequency (RF) communications.

In the context of a balloon network, embodiments described herein may generally help to maintain an optical communications link between two balloons. For example, an illustrative balloon may include auxiliary photodetectors that are arranged around the photodetector in the balloon's optical receiver system. For instance, one or more pairs of photodiodes on opposing sides of an optical receiver's photodetector. Located as such, these auxiliary photodetectors may function as alignment sensors, that help a balloon to adjust the alignment of its optical receiver with an optical transmitter of a transmitting balloon.

In particular, a balloon may detect intensity differences between alignment sensors on opposite sides of an optical receiver. Such intensity differences may indicate that the optical receiver is out of alignment with the optical transmitter of a transmitting balloon. Accordingly, the position of the receiving balloon and/or its optical receiver may be adjusted based on such an intensity difference. Specifically, positioning adjustments may be made such that intensity difference is reduced (or possibly even eliminated), and the alignment of the optical receiver and the optical transmitter on the transmitting balloon is improved.

As a specific example, consider an array of two or more photodiodes that are placed around a photodetector in a balloon's optical receiver, such that one or more of the photodiodes are located on an opposite side of the optical receiver from another one or more of the photodiodes. Configured as such, the photodiodes on both sides of the optical receiver in a given balloon may sense substantially the same amount of light when the optical receiver is correctly aligned with the optical transmitter from another balloon. On the other hand, the receiving balloon may determine that the optical receiver is not correctly aligned (and possibly how far out of alignment the optical receiver is), when the photodiodes on one side of the optical receiver detect more or less light than the photodiodes on the other side. Thus, by comparing the amount of light detected at opposing alignment sensors, a balloon may determine how well its optical receiver is aligned with the transmitter of the balloon from which an optical signal is being received.

Further, when a balloon detects its receiver is out of alignment it may correct the alignment by e.g., changing its own position, moving the optical receiver, and/or coordinating with the transmitting balloon so that the transmitting balloon can change its position and/or move its optical transmitter. For example, if auxiliary photodiodes on one side of a balloon's optical receiver detect more light (e.g., a greater intensity) than auxiliary photodiodes on the other side of the optical receiver, then the balloon may change its altitude or horizontal position, move its optical receiver, and/or coordinate with the transmitting balloon to change the altitude of or horizontally move the transmitting balloon, and/or have the transmitting balloon move its optical transmitter. Further, the receiving balloon and/or the transmitting balloon may continue to make such adjustments until the auxiliary photodiodes on both sides of its optical receiver detects substantially the same amount of light, or possibly until the difference between the intensity detected on opposite sides is less than some predetermined threshold.

II. BALLOON NETWORK EXAMPLES

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links. However, the sub node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modelled in a reasonably accurate manner. Additionally, altitudes above 17 km are typically above the maximum flight level designated for commercial air traffic. Therefore, interference with commercial flights is not a concern when balloons are deployed between 17 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of the invention.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

A. Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

B. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons area distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
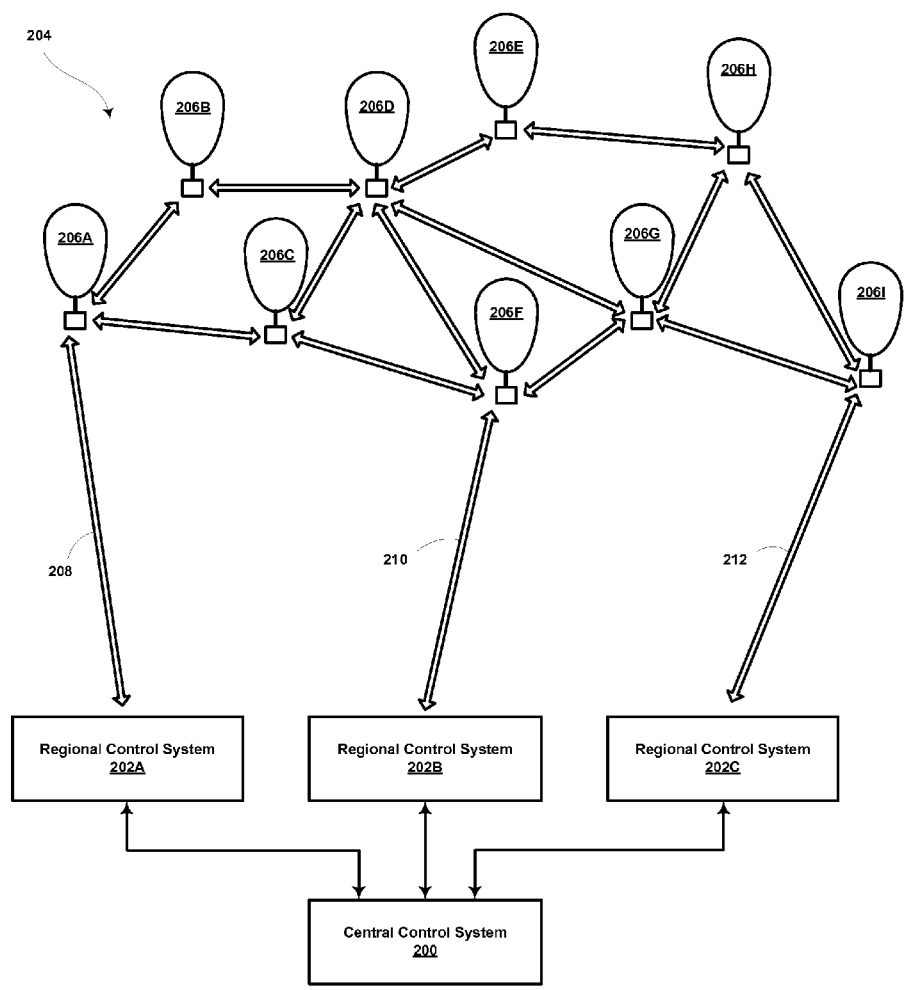
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_f$, wherein $d_f$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

III. ILLUSTRATIVE BALLOON CONFIGURATIONS

Figure 3:
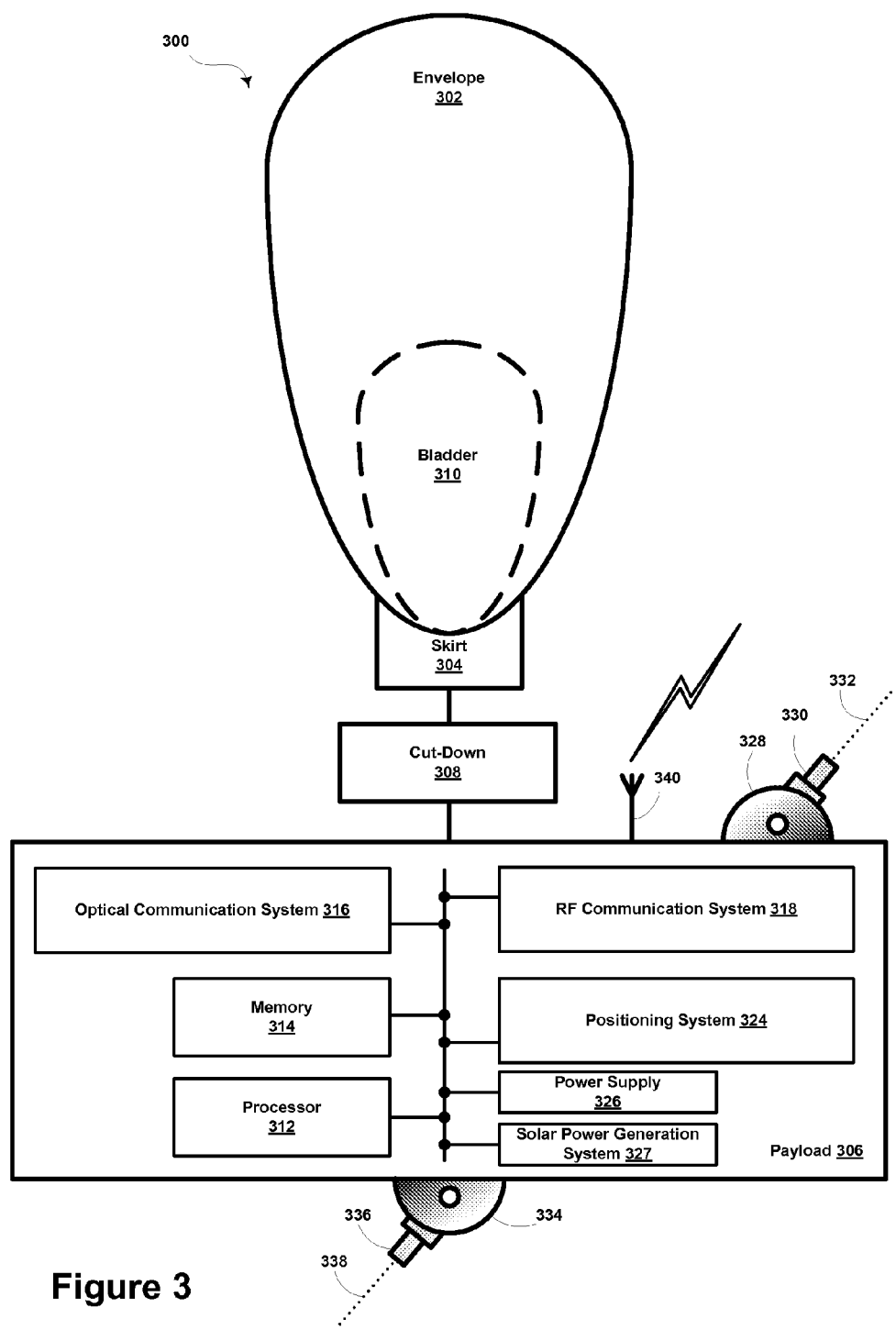
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The memory 314 may have instructions stored thereon, which can be accessed and executed by the processor 312 in order to carry out the balloon functions described herein. Further, the processor 312, in conjunction with program instructions stored in memory 314, and/or other components, may function as a control system of balloon.

The payload 306 of balloon 300 may also include various other types of equipment and systems to provide a number of different functions. For example, payload 306 may include an optical communication system 316, which may control transmission and/or reception of optical signals to and/or from other balloons. Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an optical communication system 316 for free-space optical communication with other balloons. As such, optical communication system 316 may be configured to transmit a free-space optical signal by modulating a laser or ultra-bright LED system. The optical communication system 316 may be implemented with mechanical systems and/or with hardware, firmware, and/or software. Generally, the manner in which an optical communication system is implemented may vary, depending upon the particular application. In the illustrated example, optical communication system 316 is configured to operate optical-optical-communication components 330 and 336. Within the context of this disclosure, the optical-communication components 330 and 336 may include an optical transmitter, an optical receiver, and/or an optical transceiver.

In the illustrated example, optical-communication components 330 and 336 are mechanically and/or optically coupled to gimbal mounts 328 and 334, respectively. The gimbal mounts 328 and 334 may be configured to position the optical-communication components 330 and 336, respectively, such as by pointing the respective optical-communication components 330 or 336 in a pointing direction 332 or 338, respectively.

Further, optical-communication component 330 may be configured to maintain an optical link with a first neighbouring balloon while optical-communication component 336 may be configured to maintain an optical link with a second neighbouring balloon or a ground-based station. In other words, one or more optical-communication components could be used with respective pointing mechanisms in an effort to maintain optical links with one or more ground-, air-, or space-based network nodes.

Note that the location of optical-communication components on the payload, optical-communication components 330 and 336 may vary from that illustrated in FIG. 3.

Further, various different electronic and/or mechanical systems may be used to position optical-communication components by e.g., changing a pointing direction and/or changing a location of an optical-communication component on the payload.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

Figure 4A:
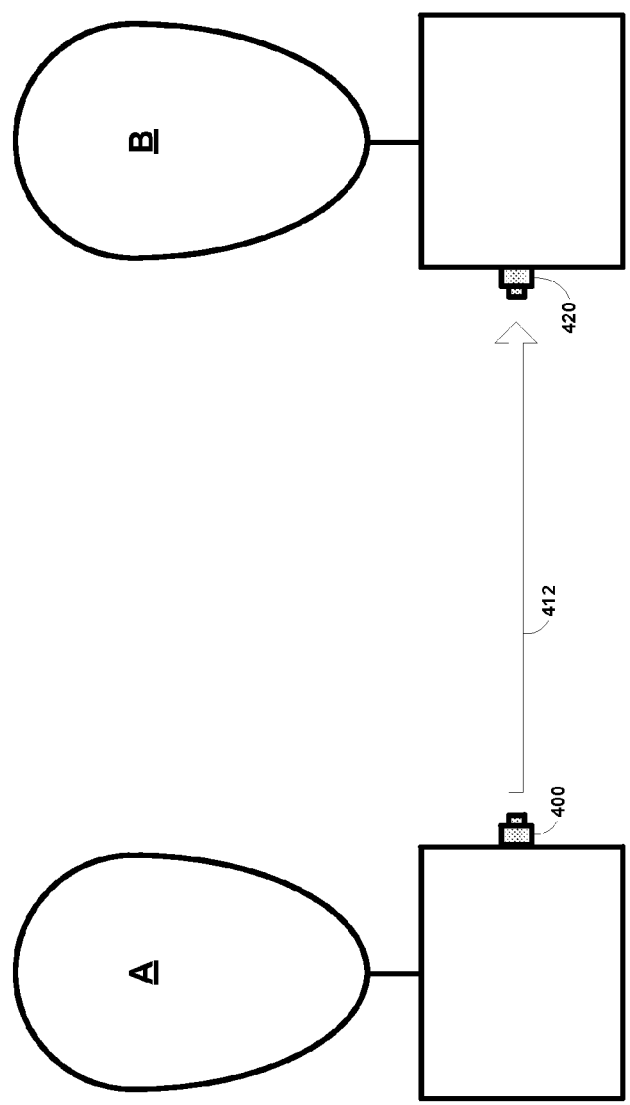
FIG. 4A is block diagram illustrating a scenario in which a balloon receives an optical signal from another balloon, according to an example embodiment.

FIG. 4A is block diagram illustrating a scenario in which a balloon A receives an optical signal from another balloon B, according to an example embodiment. Balloons A and B could each include one or more optical-communication components, such as an optical transmitter, an optical receiver, and/or an optical transceiver. Specifically, in the illustrated example, Balloon A may include an optical transmitter 400 (e.g., a transmitter employing LEDs and/or lasers) that uses beamforming to transmit an optical signal 412. Since the optical signal 412 is a beam, balloon B may be configured to substantially align its optical transmitter 420 with the optical transmitter 400 on balloon A, in order to receive and understand the optical signal 412.

Figure 4B:
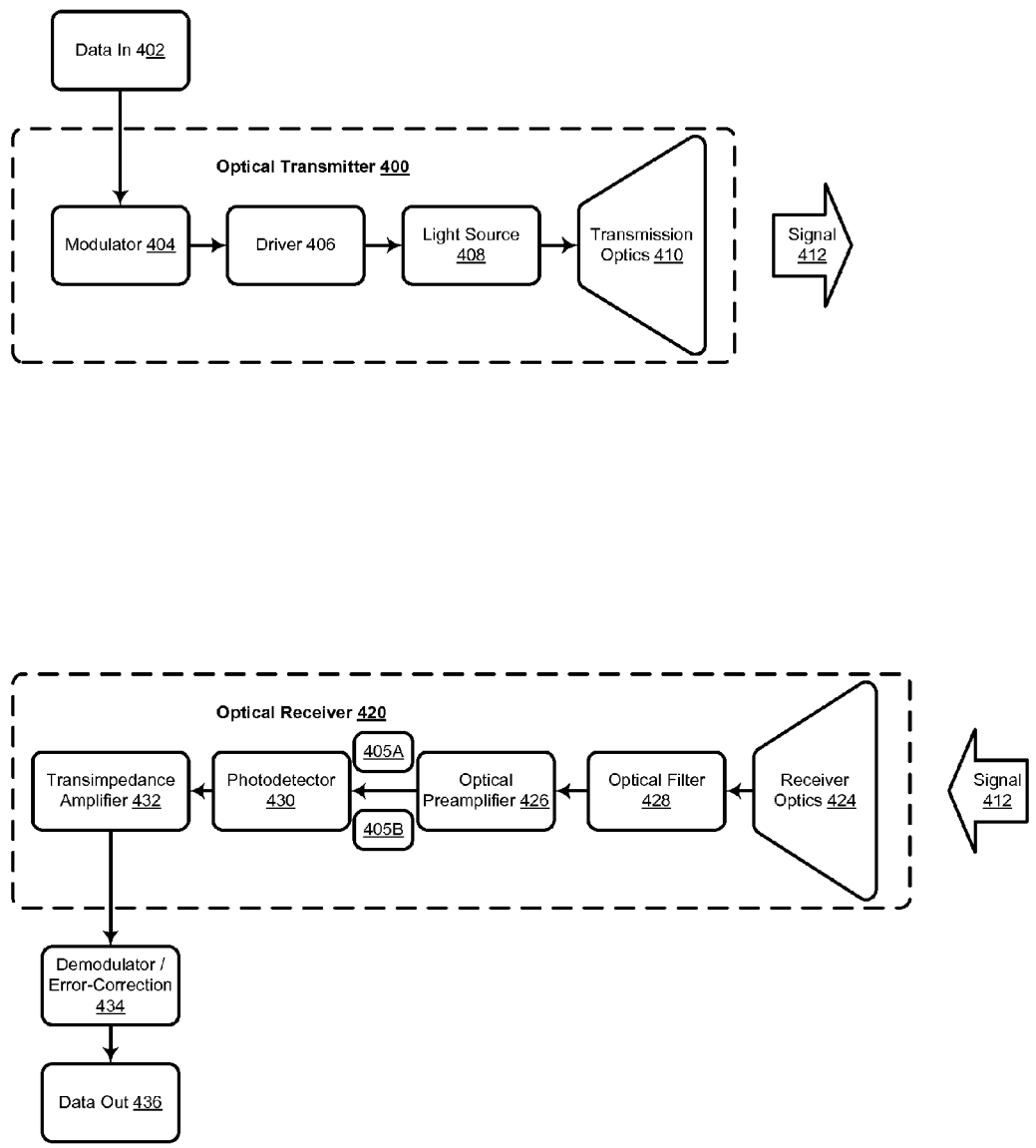
FIG. 4B is a block diagram showing a more-detailed view of the optical transmitter and the optical receiver shown in FIG. 4A, according to an illustrative configuration.

FIG. 4B is a simplified block diagram showing a more-detailed view of optical transmitter 400 and optical receiver 420, according to an illustrative configuration. In particular, the optical transmitter 420 includes receiver optics 424 that focus the optical signal onto the photodetector 430 via an optical preamplifier 426 and an optical filter 428. In an example embodiment, the optical receiver 430 may be a high-speed photodiode (e.g., that is operable to receive a gigabit signal). However, other types of photodetectors are also possible.

The optical transmitter 420 also includes two photodiodes 405A and 405B, which are configured as alignment sensors. The photodiodes 405A and 405B are positioned so as to receive the optical signal at a first and a second location, respectively. In the illustrated example, the first location and the second location are proximate to opposite sides of the optical receiver 430. Thus, by comparing the amount of light detected by the photodiodes 405A and 405B, a control system of balloon B may determine how well its optical transmitter 420 is aligned with the optical transmitter 400 of balloon A. Further, when balloon B detects that optical transmitter 420 is out of alignment it may correct the alignment by e.g., changing its own position, moving the optical receiver, and/or coordinating with balloon A so that balloon A can change its position and/or move its optical transmitter.

More specifically, balloon B may include a control system, such as described in reference to FIG. 3. The control system of balloon B may be configured to: (i) receive first light data that is indicative of the optical signal as received at the first photodiode, (ii) receive second light data that is indicative of the optical signal as received at the second photodiode, (iii) analyze the first and second light data to determine an intensity difference between: (a) the optical signal as received at the first photodiode and (b) the optical signal as received at the second photodiode, and (iv) control the positioning of the balloon and/or the optical receiver based on the intensity difference.

The first and second light data may be generated by or based on signals from photodiodes 405A and 405B, respectively. As such, the first and second light data may be indicative of the intensity of the optical signal 412 at photodiodes 405A and 405B, respectively. Therefore, the control system of balloon B may analyze the first and second light data to determine the intensity difference between the optical signal as detected at photodiodes 405A and 405B. Then, if the intensity difference is greater than some predetermined threshold, the control system may adjust the position of the optical transmitter 420 (and possibly of balloon B) in an effort to reduce the intensity difference and better align the optical transmitter 420 with the transmitter 400 at balloon A.

Additional details regarding optical transmitter 400 and optical receiver 420 will be described below in section V.

IV. ILLUSTRATIVE METHODS

Figure 5:
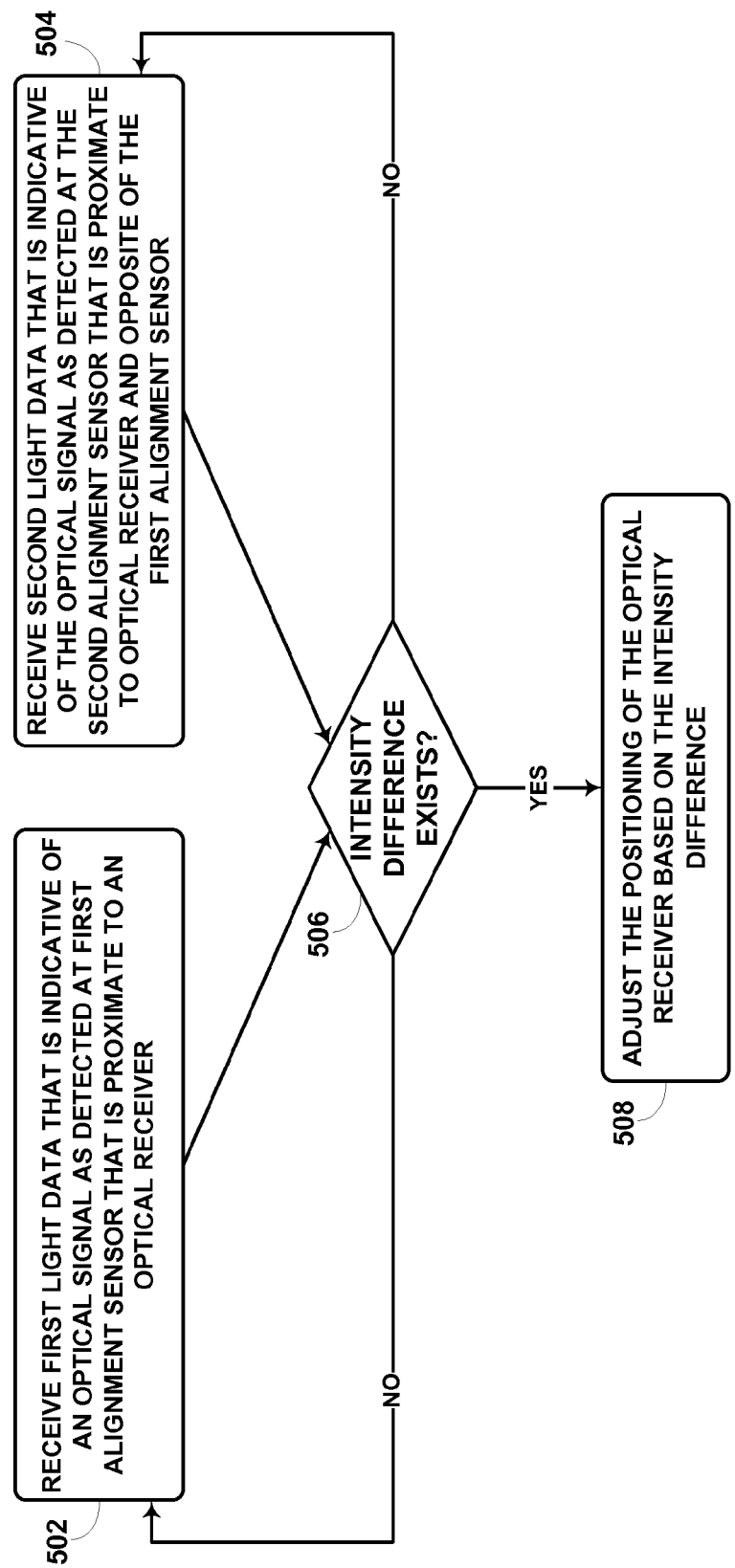
FIG. 5 is a flow chart illustrating a computer-implemented method, according to an example embodiment.

FIG. 5 is a flow chart illustrating a computer-implemented method, according to an example embodiment. Example methods, such as method 500 of FIG. 5, may be carried out by a balloon, and in particular, by one or more components of a balloon, such as a control system and/or other components. A control system may take the form of program instructions stored on a non-transitory computer readable medium (e.g., memory 314 of FIG. 3) and a processor that executes the instructions (e.g., processor 312). However, a control system may take other forms including software, hardware, and/or firmware. Further, a balloon that implements an example method, such as method 500, may include components such as those shown in FIGS. 3 and 4. As such, the balloon may include an array of alignment sensors (e.g., photodiodes) around an optical receiver, which include at least a first and a second alignment sensor, with the first and the second alignment sensor being positioned proximate to opposite sides of the balloon's optical receiver.

More specifically, as shown by block 502, method 500 involves a balloon control system receiving first light data that is indicative of an optical signal as detected at the first alignment sensor. Further, the control system receives second light data that is indicative of the optical signal as detected at the second alignment sensor, which is located on an opposite side of the optical receiver from the first alignment sensor, as shown by block 504. The control system may analyze the first and second light data to determine when an intensity difference exists between: (a) the optical signal as received at the first alignment sensor and (b) the optical signal as received at the second alignment sensor, as shown by block 506. If no intensity difference exists, then the control system may continue to monitor the light data from the photodiodes (typically without adjusting the positioning of the optical receiver), as indicated by the arrows from block 506 back to blocks 502 and 504. However, if the control system detects an intensity difference, the control system may respond by adjusting the positioning of the optical receiver based on the intensity difference, as shown by block 508.

A. Illustrative Configurations for Photodiodes Proximate to an Optical Receiver

An example method, such as method 500, may be implemented in conjunction with various arrangements of alignment sensors. Examples of adjustment-sensor arrangements are described below in reference to FIGS. 6A to 6F, which are simplified illustrations of photodiode arrays that are proximate to an optical receiver.

As noted above, alignment sensors may be located on opposite sides of the balloon's optical receiver, and in particular, on opposite sides of the receiver's photodetector. Accordingly, in some embodiments, a first photodiode may be located to a first side with respect to the center of the optical receiver (i.e., with respect to the center of the optical receiver of the optical receiver system). Further, a second photodiode may be located to a second side with respect to the center of the optical receiver, which is opposite to the first side.

Figure 6A:
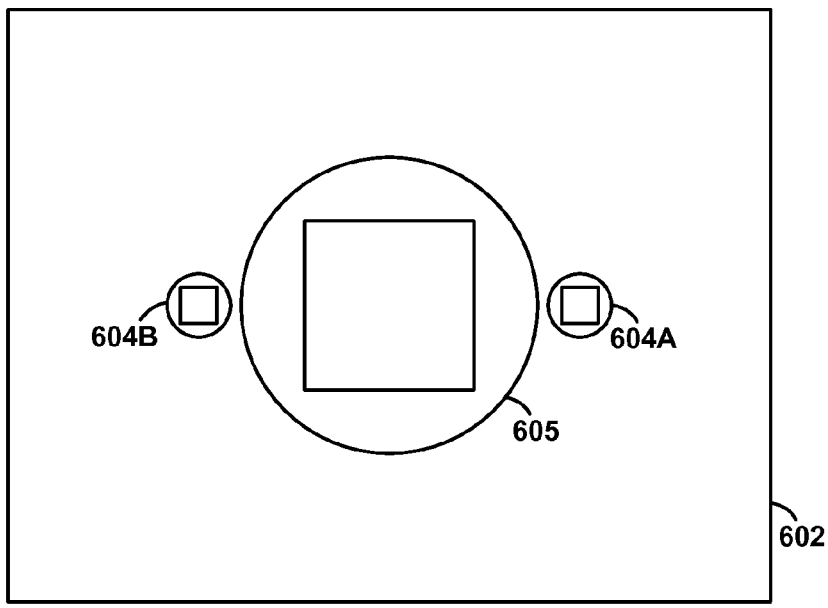
FIGS. 6A to 6F are simplified illustrations of adjustment-sensor arrangements, according to example embodiments.

For example, FIG. 6A shows an array of photodiodes 604A to 604B that are proximate to a photodetector 605 of an optical receiver 602, according to an example embodiment. As shown, a first photodiode 604A is at a location that is left of center with respect to the center of the photodetector 605, and a second photodiode 604B is at a location to the right of center, with respect to the center of the photodetector 605. (For explanatory purposes, the description herein refers to left and right as being left and right when facing the page, unless explicitly stated to the contrary.)

Figure 6B:
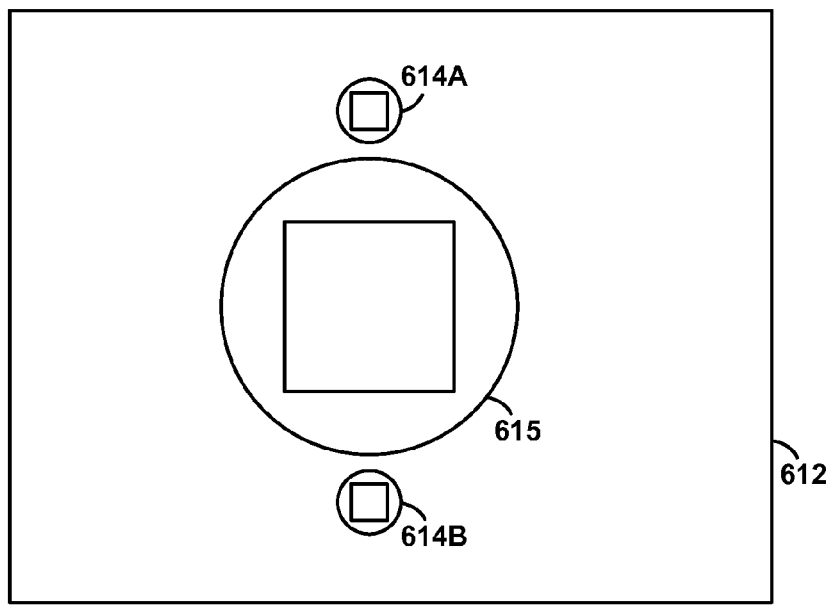

In some embodiments, method 500 may be implemented in conjunction with a photodiode array that includes a first photodiode located above-center with respect to the center of the optical receiver in a balloon's optical receiver system, and a second photodiode located below the photodetector. For example, FIG. 6B is another simplified illustration of an array of photodiodes 614A and 614B that are proximate to a photodetector 615 of an optical receiver 612, according to an example embodiment. In particular, the first photodiode 614A is located above the photodetector 615, and a second photodiode is located below the photodetector 615.

Figure 6C:
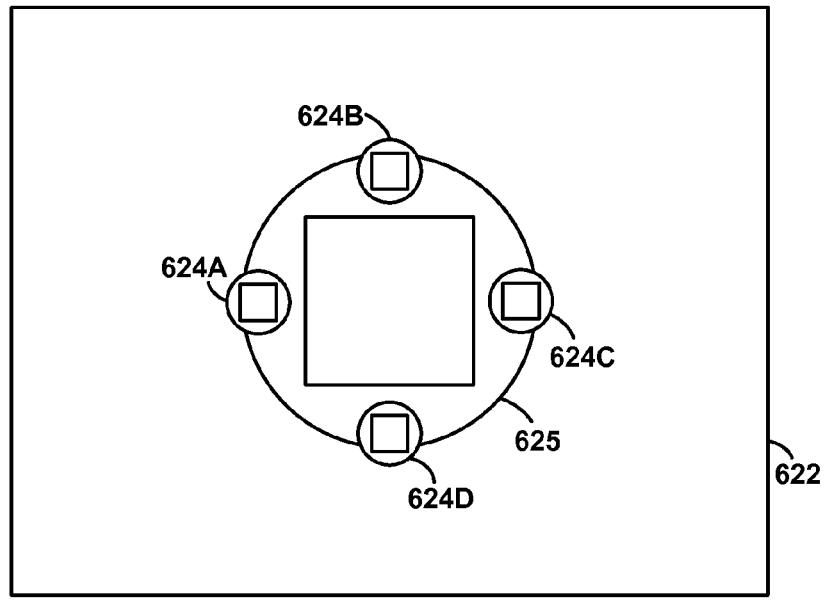

Method 500 may also be implemented in conjunction with a photodiode array that includes more than two photodiodes. For example, FIG. 6C is another simplified illustration of an array of four photodiodes 624A to 624D that are proximate to the photodetector 625 of an optical receiver 622, according to an example embodiment. In particular, the photodiode array includes a photodiode 624A that is located to the left of photodetector 625 and a photodiode 624C that is located to the right of the photodetector 625 (opposite of photodiode 624A). The photodiode array also includes a photodiode 624B that is located above photodetector 625 and a photodiode 624D that is located below photodetector 625 (opposite of photodiode 624B).

Figure 6D:
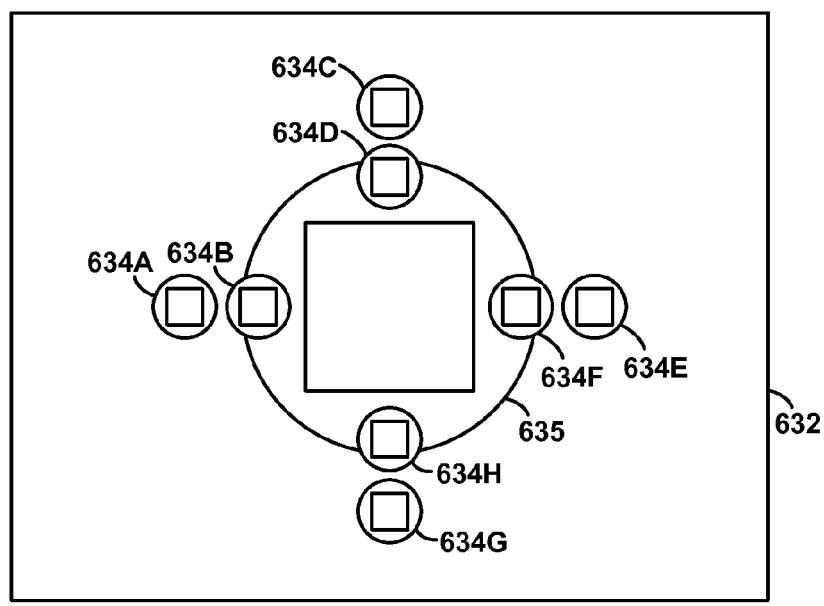

As an additional example, FIG. 6D is a simplified illustration of another array of photodiodes 634A to 634H that are proximate to a photodetector 635 of an optical receiver 632, according to an example embodiment. In particular, the photodiode array shown in FIG. 5D includes two photodiodes 634A and 634B located to the left of photodetector 635, two photodiodes 634C and 634D located above photodetector 635, two photodiodes 634E and 634F located below photodetector 635, and two photodiodes 634G and 634H located to the right of photodetector 635.

Figure 6E:
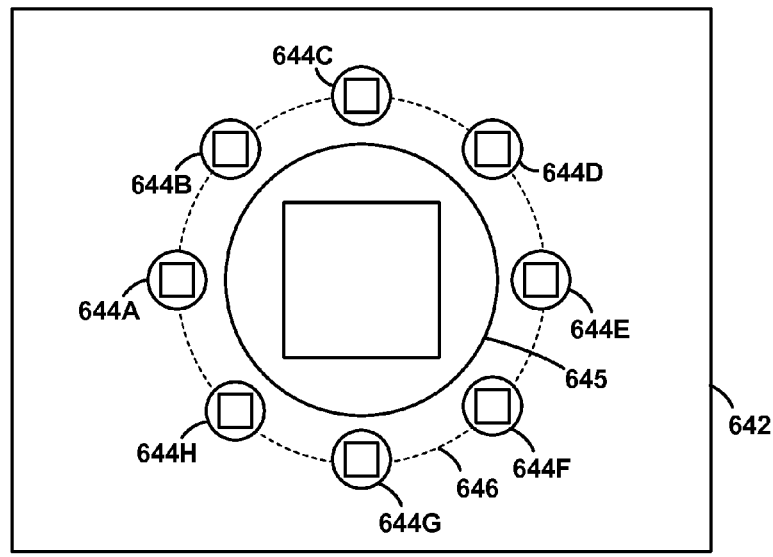

As a further example, FIG. 6E is a simplified illustration of another array of photodiodes 644A to 644H that are proximate to a photodetector 645 of an optical receiver 642, according to an example embodiment. In particular, photodiodes 644A to 644H are arranged in a circular pattern 646 around photodetector 645.

Figure 6F:
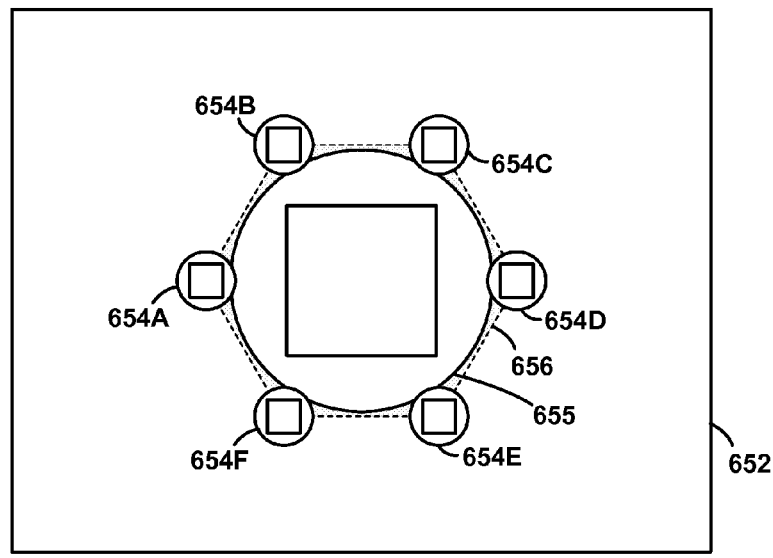

As yet a further example, FIG. 6F is a simplified illustration of another array of photodiodes 654A to 654F that are proximate to a photodetector 655 of an optical receiver 652, according to an example embodiment. In particular, photodiodes 654A to 654F are arranged in a hexagonal pattern 656 around photodetector 655.

In the adjustment-sensor arrays illustrated in FIGS. 6A to 6F, each photodiode and its opposite photodiode are generally arranged such that they are equidistant from the center of the photodetector of the optical receiver. However, arrangements where pairs of opposing photodiodes are not equidistant from the center of the photodetector are also possible. Further, a photodiode need not be opposite (i.e., need not be directly across from) another photodiode in such an array.

Further, note that the alignment sensors in FIGS. 6A to 6F are shown as being located such that they do not block the direct path of an optical signal being received at the photodetector of the optical receiver (e.g., they are not in front of the receiver's photodetector). For instance, in the arrangement shown in FIG. 6A, the photodiodes 604A and 604B are located to the sides the optical receiver 602. That is, photodiodes 604A and 604B do not block the direct path of an optical signal being received and the photodetector of the optical receiver 602. However, in other embodiments, it is possible that photodiodes may be located in front of a portion of the photodetector, so long as the photodiodes do not significantly interfere with the reception of the optical signal by the optical receiver.

Generally, it should be understood that the example arrangements of alignment sensors shown in FIG. 6A to 6F are provided for explanatory purposes and are not intended to be limiting. Other arrangements of alignment sensors and/or variations on the arrangements described herein are possible.

B. Determining an Intensity Difference

As noted above, block 506 of method 500 may involve a balloon's control system an intensity difference between two or more alignment sensors that are proximate to an optical receiver. Then, at block 508, the balloon's control system may position the optical receiver and/or the balloon itself in an effort to reduce the intensity difference at the photodiodes on opposite sides of the balloon's optical receiver.

For instance, referring to FIG. 6A, a control system may determine a first intensity value corresponding to photodiode 604A and a second intensity value corresponding to photodiode 604B. The control system may then determine a measure of the intensity difference between by comparing the first and the second intensity values, such as by subtracting the one intensity value from the other and setting the absolute value of the difference as the intensity difference.

An intensity difference between alignment sensors at the left and right of an optical receiver, such as photodiodes 604A and 604B, may be indicative of the optical receiver being horizontally out of alignment. Therefore, when an intensity difference is detected between such horizontally-arranged alignment sensors, the control system may adjust the horizontal position by moving the optical receiver parallel to the ground, so as to better align the optical receiver with the transmitting balloon's optical transmitter.

In a similar manner, and referring to FIG. 6B, an intensity difference between alignment sensors above and below an optical receiver, such as between photodiodes 614A and 614B, may be indicative of the optical receiver being vertically out of alignment. Therefore, when an intensity difference is detected between such vertically-arranged alignment sensors, the control system may adjust the vertical position by moving the optical receiver up or down with respect to the ground, so as to better align the optical receiver with the transmitting balloon's optical transmitter.

In some embodiments, alignment sensors may be arranged around an optical receiver so as to help detect both horizontal and vertical misalignment of the optical receiver. For example, referring to FIG. 6C, when a first intensity difference exists between horizontally-arranged photodiodes 624A and 624C and a second intensity difference concurrently exists between vertically-arranged photodiodes 624B and 624D, this may indicate that the optical receiver is both horizontally and vertically out of alignment. In this scenario, the control system may move the optical receiver both horizontally and vertically. To do so, the control system may move the optical receiver along a diagonal path (e.g., with horizontal and vertical components of the motion corresponding to the horizontal and vertical misalignment, respectively). Alternatively, the control system may first move the optical receiver horizontally and then move it vertically, or vice versa.

Figure 7:
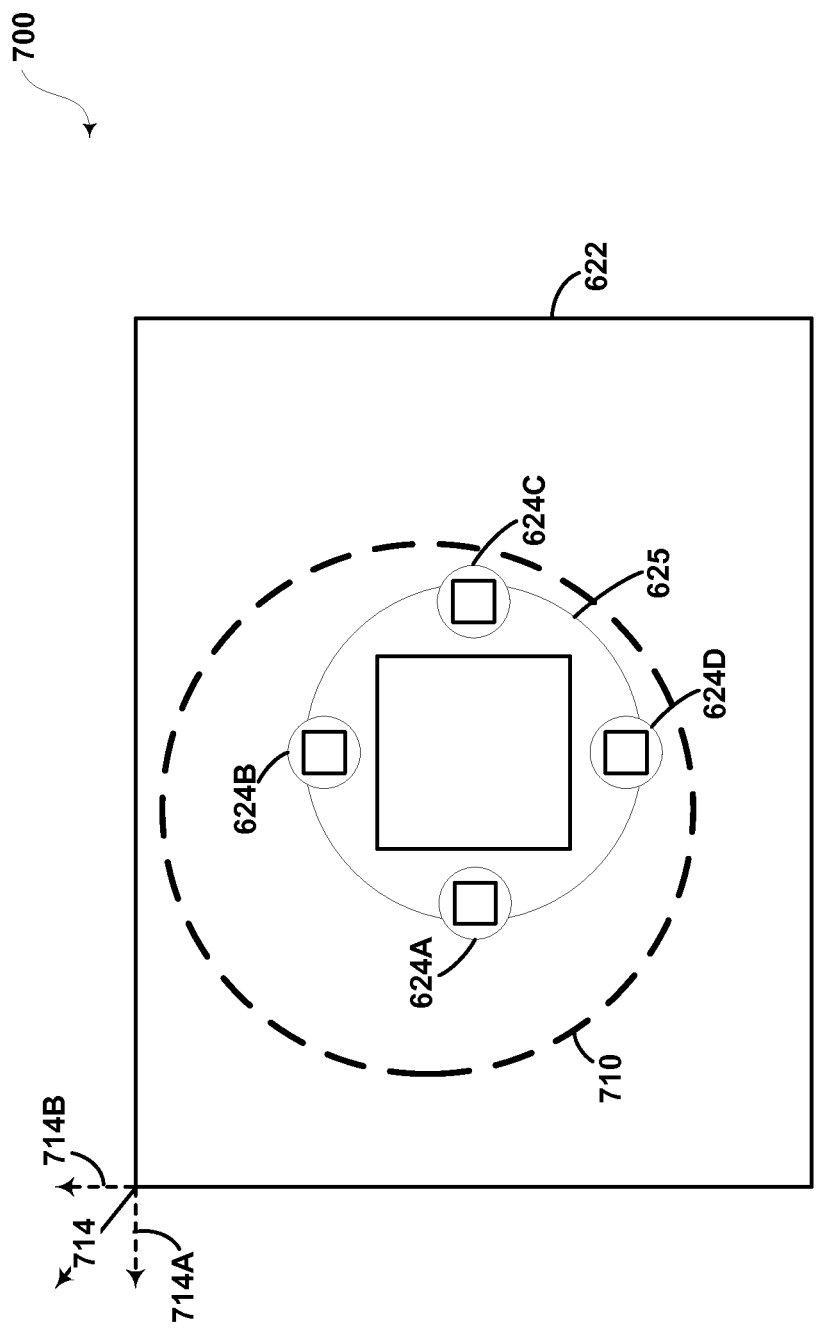
FIG. 7 shows an example scenario where the position of an optical receiver may be adjusted.

As a specific example, FIG. 7 shows an example scenario 700 where the position of the optical receiver 622 of FIG. 6 may be adjusted. In particular, the example scenario 700 involves the photodetector 625 of optical receiver 622 receiving an optical signal 710. Further, optical signal 710 may be detected by alignment sensors 624A to 624D. In particular, each alignment sensor 624A to 624D may be a photodiode configured to determine or facilitate determination of the intensity of light received at the photodiode.

The optical signal 710 may generally take the form of a beam, and thus may also be referred to as an optical-signal beam 710. As such, the intensity of optical signal 710 may generally be greater towards the center of the beam, and may generally decrease the further away a location is from the center of the beam. Thus, when optical signal beam 710 is out of alignment, the intensity of the optical signal measured at different alignment sensors 624A to 624D may vary. The balloon's control system may therefore respond by adjusting the position of optical receiver 622 so as to better align the photodetector 625 with the optical-signal beam 710 that is being received.

More specifically, in scenario 700, alignment sensor 624A is located closer to the center of the optical-signal beam 710 than alignment sensor 624C. As a result, the intensity value measured at alignment sensor 624A may be greater than the intensity value measured at alignment sensor 624C. Similarly, because alignment sensor 624B is located closer to the center of the optical-signal beam 710 than alignment sensor 624D, the intensity value measured at alignment sensor 624B may be greater than the intensity value measured at alignment sensor 624D. Accordingly, in scenario 700, a balloon's control system may determine that an intensity difference exists and responsively initiate a process to reposition the balloon's optical receiver 622.

In particular, optical-signal beam 710 may create an intensity difference between horizontally-aligned alignment sensors 624A and 624C, and between vertically-aligned alignment sensors 624B and 624D. Specifically, if the intensity decreases towards the edge of beam 710, the intensity value at the left alignment sensor 624A will be greater than the intensity value at the right alignment sensor 624C. For the same reason, the intensity value at the upper alignment sensor 624B will be greater than the intensity value at the lower alignment sensor 624D.

The control system may accordingly determine a horizontal component 714A for repositioning the optical receiver 622, which is based on the intensity difference between horizontally-aligned alignment sensors 624A and 624C. In an example embodiment, the horizontal component may be directed so as to reduce the intensity difference between horizontally aligned sensors. Thus, in scenario 700, horizontal component 714A is directed to the left in an effort to position optical receiver 622 such that the distance between alignment sensor 624C and the center of beam 710 decreases (and the distance between alignment sensor 624A and the center of beam 710 increases by a corresponding amount).

Similarly, the control system may determine a vertical component 714B for repositioning the optical receiver 622, which is based on the intensity difference between vertically-aligned alignment sensors 624B and 624D. In an example embodiment, the vertical component may be directed so as to reduce the intensity difference between vertically aligned sensors. Thus, in scenario 700, vertical component 714B is directed upwards, in an effort to position optical receiver 622 such that the distance between alignment sensor 624D and the center of beam 710 decreases (and the distance between alignment sensor 624B and the center of beam 710 increases by a corresponding amount).

The control system may then determine how to reposition the optical receiver by combining the horizontal component 714A and the vertical component 714B. In particular, the control system may respond to the intensity differences in scenario 700 by moving the optical receiver 622 as indicated by vector 714.

Note that the amount of movement (e.g., the magnitude of vector 714) may be determined in various ways. In some embodiments, the control system may iteratively adjust the position of the optical receiver 622 by moving the optical receiver a predetermined amount in the appropriate direction (e.g., the direction of vector 714), repeating method 300 to determine if an intensity difference still exists, and then continuing this process until the intensity difference is less than some predetermined threshold.

In other embodiments, the amount of repositioning may be dynamically determined based on, e.g., the intensity difference. For instance, the intensity difference between horizontally-arranged alignment sensors 614A and 614C may be used to determine the magnitude of horizontal component 714A. Specifically, based on known data such as characteristics of the optical-signal beam 710, the position(s) of the receiving and/or transmitting balloons, the characteristics of the optical receiver and/or the optical transmitter, and/or other data, a control system may calculate the distance of a movement that is expected to result in the intensity difference being zero.

To do so, the control system may, calculate the distance of a horizontal movement that is expected to result in the horizontally-arranged alignment sensors 614A and 614C being equidistant from the center of optical-signal beam 710. The magnitude of the vertical component 714B may be determined in a similar manner, based on similar data related to vertically-arranged alignment sensors 614B and 614D.

In some embodiments, the magnitude of the horizontal and vertical components 714A and 714B may be set equal to the respectively calculated distances that are expected to result in the respectively corresponding intensity differences being zero. However, in other embodiments, the magnitudes of the horizontal and vertical components 714A and 714B may be only a portion of the respectively calculated distances. For instance, the control system may set the magnitudes of the horizontal and vertical components 714A and 714B to be a fifth of the respectively calculated distances. Then after the optical receiver has been repositioned accordingly, the control system may recalculate the intensity differences and adjust the positioning of the optical receiver until the intensity differences are less than a predetermined threshold or thresholds. (Note that the intensity-difference threshold for the horizontally-arranged alignment sensors 624A and 624C may be the same as or different from the intensity-difference for the vertically-arranged alignment sensors 624B and 624D.)

C. Positioning the Optical Receiver

Referring back to FIG. 5, at block 508 method 500, the positioning of the optical receiver may be accomplished in various ways. In particular, a balloon may include mechanical systems for positioning an optical receiver. For example, a mechanical system such as the gimbal mount 328 or 334 shown in FIG. 3 may be moveable to point an optical receiver; or in other words to change the angular position of the optical receiver with respect to the balloon. Additionally or alternatively, a balloon may include mechanical systems that are configured to move an optical receiver horizontally, vertically, and/or diagonally with respect to a surface of the balloon (e.g., to move the optical receiver around on the side of the payload).

Further, in some embodiments, positioning of the optical receiver may be accomplished via movement of the balloon itself. In particular, a balloon may move horizontally with respect to the ground and/or may change its altitude in order to adjust the positioning of the optical receiver in a desired manner. To position its optical receiver, a balloon may use balloon movements or mechanical systems exclusively, or may use a combination of these and possibly other techniques.

D. Coordinating the Positioning of the Optical Transmitter

In a further aspect, a balloon may respond to an intensity difference by communicating with the balloon that is transmitting the optical signal so that the transmitting balloon can position its optical transmitter based on the difference. In particular, the balloon may send light data or data based thereon to the transmitting balloon so that the transmitting balloon can determine a positioning adjustment in an effort to better align its transmitter with the receiver of the receiving balloon.

Alternatively, the receiving balloon may determine a positioning adjustment that is desired for the transmitting balloon. Such a positioning adjustment may be determined based on an intensity difference, in a similar manner as the receiving balloon determines its own positioning adjustment. The receiving balloon may then send a message to the transmitting balloon that indicates the desired positioning adjustment.

V. ILLUSTRATIVE OPTICAL TRANSMITTER AND RECEIVER CONFIGURATIONS

Referring back to FIG. 4B in more detail, the optical transmitter 400 could receive data in 402 that could be in the form of electrical and/or optical signals. The electrical and/or optical signals that comprise the data in 402 may include information in the form of one or more digital or analog voltage and/or optical intensity level(s). The data in 402 could be received by the optical transmitter 400 via an electrical (e.g., wire or multi-conductor cable) or optical (e.g., optical fiber or waveguide) connection. Modulator 404 could encode the information from the data in 402 using one or more encoding techniques, such as intensity modulation, phase modulation, pulse-wave modulation, and/or frequency modulation. Those skilled in the art will understand that modulator 404 could reasonably use other known encoding schemes.

A driver 406 may convert the encoded information into a driving signal that could act to illuminate a light source 408. In an example embodiment, light source 408 could represent one or more light-emitting diodes (LED) or lasers. The light source 408 could also include other high-power light sources known in the art. The emission wavelengths of light source 408 could be in the ultraviolet, visible, infrared and microwave spectral regimes. The wavelength band of emission could be relatively narrow (e.g., a few nanometers in spectral width). Alternatively, the wavelength band could be broadband (e.g., a large portion of visible spectrum, as is common in 'white' LED emission). Further, light source 408 could be configured to emit light at multiple discrete wavelengths (e.g., with a two-color laser) or within multiple wavebands (e.g., with a multi-color LED).

The light source 408 could be configured to modulate (e.g., turn on and off) at high frequencies in order to achieve more than 10 gigabit-per-second (GBit/s) data throughput. Light emitted from light source 408 could be either collimated or uncollimated. Further, the intensity of the emitted light could be adjustable. The emitted light could be collimated and/or focused by transmission optics 410. The transmission optics 410 could include elements such as a telescope and/or a beam expander. Depending upon the embodiment, other optical elements could be included in the transmission optics 410, such as those known in the art that may be used for long-range imaging.

In an alternative embodiment, light emitted from the light source 408 could be modulated by a modulator. For instance, a polarization modulator could be configured to modulate the polarization of the light emitted from light source 408. In such a scenario, the free-space optical signal could include data based, at least in part, on the polarization of light. Various modulator types are possible, including a liquid-crystal modulator and a spatial light modulator, among others. In practice, the free-space optical signal could include more than one type of light modulation. Further, the light modulation could be performed at high frequencies to achieve more than 10 GBit/s data transmission.

Depending upon the embodiment, the elements of the transmission optics 410 could be configured in different ways in an effort to efficiently transmit output light as a free-space optical signal, such as signal 412, to a correspondent balloon. For instance, the transmission optics 410 could be configured to provide an optical-communications link over several kilometers. In other embodiments, the transmission optics 410 could be configured differently in order to establish an optical-communications link with a ground-based station or a space-based platform. For instance, the configuration of optical components in the transmission optics 410 could be different if the intended target was a ground-based station (15-30 km away) compared to if the intended target was a space-based platform (geosynchronous orbits can be over 42,000 km). Therefore, the distance between the balloon and a space-based target could be over 42,000 km away. Accordingly, the optical components in the transmission optics 410 could be adjusted (e.g., by using a zoom and/or focusing feature on the telescope). In other embodiments, separate sets of transmission optics 410 could be used based upon, for instance, the intended target distance and target altitude.

An optical receiver 420 could be configured to receive a signal 412 that could represent part of an optical-communications link. The signal 412 could be a free-space optical signal with encoded information from a correspondent balloon or another airborne platform. The signal 412 could also originate from a ground-based station or a space-based platform (e.g., a satellite or other space-craft).

Signal 412 could be optically collected by receiver optics 424. Receiver optics 424 could include a telescope or any combination of optics (such as refractive lenses and reflective mirrors) known in the art for receiving free-space optical signals at long distances (e.g., more than several kilometers). Light received by the receiver optics 424 could be amplified using an optical preamplifier 426. The optical preamplifier 426 could include one or more of a doped fiber amplifier, semiconductor optical amplifier (SOA), Raman amplifier, and/or a parametric amplifier. Other optical amplifier types are possible within the context of this disclosure.

The optical signal could be filtered by an optical filter 428. In some embodiments, the optical filter could include an absorptive filter, an interference filter, and/or a dichroic filter. The optical signal could be filtered in various ways, for instance based upon wavelength (e.g., in a bandpass filter) and/or polarization (e.g., with a polarizer or waveplate).

The filtered light could be detected by a photodetector 430. The photodetector 430 could include one or more photodiodes, charge-coupled devices (CCD), photoconductors, or other means for photon-sensing known in the art. The photodetector 430 could include a multiple element detector system configured to detect changes in an optical beam location. In an example embodiment, the photodetector could transduce incident light into a photocurrent signal. The photocurrent signal could then be amplified with a transimpedance amplifier 432. The transimpedance amplifier 432 may be configured to convert the photocurrent signal into a voltage and provide signal gain. Other amplifier types are possible, and could be dependent, for instance, upon the output type of the photodetector. For instance, if the photodetector 430 is a photoconductive device that produces a photovoltage, a tranconductance amplifier could be used to convert the photovoltage to a signal current. Those skilled in the art will understand that there are many other ways to convert a photosignal into an electrical signal, and those other ways are contemplated herein.

The optical receiver could also include a demodulator/error-correction element 434, which may be configured to extract information from the signal 412. The type of demodulation utilized by the demodulator/error-correction element 434 may depend upon the type of modulation initially performed on the optical signal. For instance, the demodulation method may include carrier recovery, clock recovery, frame synchronization, pulse compression, error detection and correction, and/or mixing with a local oscillator (e.g., heterodyne detection). Other demodulation methods known in the field of optical and digital signal processing are possible.

The demodulator/error-correction element 434 could be further configured to detect and correct errors in the as-received signal. For instance, the element 434 could include a hash function, a checksum algorithm, and/or other redundancy check algorithms in an effort to reduce data transmission errors. Further, error-correcting codes (ECCs) (e.g., Turbo or low-density parity-check codes) could be implemented in the demodulator/error-correction element 434 to detect and correct errors. If errors are found, the optical receiver 420 could be configured to correct the error automatically with a forward error correction (FEC) algorithm. Alternatively, the optical receiver 420 could be configured to send an automatic repeat request (ARQ) to the transmitting node via a reverse channel in an effort to get a new transmission of the data.

In reference to FIG. 3, the optical-communication component(s) 330, such as optical transmitter 400 and/or optical receiver 420, could be mechanically and/or optically coupled to a gimbal mount 328. The gimbal mount 328 could be configured to adjustably point in a pointing direction 332. Second optical-communication component(s) 336 could be mechanically and/or optically coupled to a gimbal mount 334 and oriented along a pointing direction 338. The second optical-communication component(s) 336 could represent multiple components configured to maintain optical communication links with multiple nodes and/or nodes at varying altitudes. For instance, optical-communication component 330 could be configured to maintain an optical link with a neighboring balloon while optical-communication component 336 could be configured to maintain an optical link with a ground-based station. In other words, one or more optical-communication components could be used with respective pointing mechanisms in an effort to maintain optical links with one or more ground-, air-, or space-based network nodes. Within the context of this disclosure, the optical-communication components 330 and 336 may include an optical transmitter, an optical receiver, and/or an optical transceiver.

VI. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:
1. A balloon system comprising:
an optical receiver configured to receive an optical signal at a balloon;
a plurality of alignment sensors comprising at least a first and a second alignment sensors, wherein the first and the second alignment sensors are positioned so as to detect the optical signal at a first and a second location, respectively, and wherein the first location and the second location are proximate to opposite sides of the optical receiver; and
a control system configured to:
receive first light data that is indicative of the optical signal as received at the first alignment sensor;
receive second light data that is indicative of the optical signal as received at the second alignment sensor;
analyze the first and second light data to detect an intensity difference between: (a) the optical signal as received at the first alignment sensor and (b) the optical signal as received at the second alignment sensor;
determine a desired horizontal movement of the balloon;
receive altitudinal wind data;
determine a desired altitude based on the desired horizontal movement and the received altitudinal wind data such that wind at the desired altitude contributes to the desired horizontal movement of the balloon; and
in response to detection of the intensity difference and determination of the desired altitude, initiate a process to control positioning of the optical receiver based on the intensity difference and the desired altitude, wherein the process comprises moving the optical receiver towards the desired altitude via at least one of the following: (a) a change in the altitude of the balloon and (b) a change in position of the optical receiver with respect to the balloon.

2. The balloon system of claim 1, wherein the optical receiver comprises a first photodetector, and wherein the plurality of alignment sensors comprises a plurality of second photodetectors.

3. The balloon system of claim 2, wherein plurality of second photodetectors comprise a plurality of photodiodes.

4. The balloon system of claim 1, wherein the optical receiver comprises a photodetector, and wherein the first location is to a first side of the photodetector, and wherein the second location is to a second side of the photodetector, wherein the second side is opposite to the first side.

5. The balloon system of claim 1, wherein the optical receiver comprises a photodetector, wherein the first location is left of center with respect to the center of the photodetector, and wherein the second location is right of center with respect to the center of the photodetector.

6. The balloon system of claim 1, wherein the optical receiver comprises a photodetector, wherein the first location is above the photodetector, and wherein the second location is below the photodetector.

7. The balloon system of claim 1, wherein the optical receiver comprises a photodetector, wherein the first location is above center with respect to the center of the photodetector, and wherein the second location is below center with respect to the center of the photodetector.

8. The balloon system of claim 1, further comprising a third alignment sensor and a fourth alignment sensor that are positioned so as to receive the optical signal at a third and a fourth location, respectively.

9. The balloon system of claim 8, wherein the optical receiver comprises a photodetector, wherein the first and the third location are both to a first side of the photodetector, and wherein the second and the fourth location are both to a second side of the photodetector, wherein the second side is opposite to the first side.

10. The balloon system of claim 8:
wherein the optical receiver comprises a photodetector;
wherein the first location is left of center with respect to the center of the photodetector;
wherein the second location is right of center with respect to the center of the photodetector;
wherein the third location is above center with respect to the center of the photodetector; and
wherein the fourth location is below center with respect to the center of the photodetector.

11. A computer-implemented method comprising:
receiving first light data that is indicative of an optical signal as received at a first of a plurality of alignment sensors, wherein the plurality of alignment sensors comprises at least the first and a second alignment sensor, wherein the first and the second alignment sensor are positioned so as to detect the optical signal at a first and a second location, respectively, and wherein the first location and the second location are proximate to opposite sides of an optical receiver of a balloon;
receiving second light data that is indicative of the optical signal as detected at the second alignment sensor;
analyzing the first and second light data to determine an intensity difference exists between: (a) the optical signal as detected at the first alignment sensor and (b) the optical signal as detected at the second alignment sensor;
determining a desired horizontal movement of the balloon;
receiving altitudinal wind data;
determining a desired altitude based on the desired horizontal movement and the received altitudinal wind data such that wind at the desired altitude contributes to the desired horizontal movement of the balloon; and
in response to detecting the intensity difference and determining the desired altitude, positioning the optical receiver based on the intensity difference and the desired altitude, wherein positioning the optical receiver comprises moving the optical receiver to the desired altitude via a process that comprises at least one of the following actions: (a) changing the altitude of the balloon and (b) changing a position of the optical receiver on the balloon.

12. The method of claim 11, wherein analyzing the first and second light data to determine an intensity difference exists comprises:
determining a first intensity value corresponding to the optical signal as detected at the first alignment sensor;
determining a second intensity value corresponding to the optical signal as detected at the second alignment sensor; and
determining a difference between the first intensity value and the second intensity value.

13. The method of claim 12, wherein analyzing the first and second light data to determine an intensity difference exists comprises determining that the difference between the first intensity value and the second intensity value is greater than a predetermined threshold.

14. The method of claim 11, further comprising repeating the method of claim 11 until the intensity difference is less than a predetermined threshold.

15. The method of claim 11, wherein the first and the second alignment sensor are arranged horizontally opposite one another, and wherein positioning the optical receiver based on the intensity difference comprises moving the optical receiver horizontal to the ground.

16. The method of claim 11, wherein the first and the second alignment sensor are arranged vertically opposite one another, and wherein positioning the optical receiver based on the intensity difference comprises changing the altitude of the optical receiver.

17. A non-transitory computer readable medium having stored therein instructions executable by a computing device to cause the computing device to perform functions comprising:
receiving first light data that is indicative of an optical signal as received at a first of a plurality of alignment sensors, wherein the plurality of alignment sensors comprises at least the first and a second alignment sensor, wherein the first and the second alignment sensor are positioned so as to detect the optical signal at a first and a second location, respectively, and wherein the first location and the second location are proximate to opposite sides of an optical receiver of a balloon;
receiving second light data that is indicative of the optical signal as detected at the second alignment sensor;
analyzing the first and second light data to determine an intensity difference exists between: (a) the optical signal as detected at the first alignment sensor and (b) the optical signal as detected at the second alignment sensor;
determining a desired horizontal movement of the balloon;
receiving altitudinal wind data;
determining a desired altitude based on the desired horizontal movement and the received altitudinal wind data such that wind at the desired altitude contributes to the desired horizontal movement of the balloon; and
in response to detecting the intensity difference and determining the desired altitude, positioning the optical receiver based on the intensity difference and the desired altitude, wherein positioning the optical receiver comprises moving the optical receiver to the desired altitude via a process that comprises at least one of the following actions: (a) changing the altitude of the balloon and (b) changing a position of the optical receiver on the balloon.

18. The computer readable medium of claim 17, wherein analyzing the first and second light data to determine an intensity difference exists comprises:
determining a first intensity value corresponding to the optical signal as detected at the first alignment sensor;
determining a second intensity value corresponding to the optical signal as detected at the second alignment sensor; and
determining a difference between the first intensity value and the second intensity value.

19. The computer readable medium of claim 17, wherein analyzing the first and second light data to determine an intensity difference exists comprises determining that the difference between the first intensity value and the second intensity value is greater than a predetermined threshold.

20. The computer readable medium of claim 17, further comprising instructions executable by the computing device to cause the computing device to perform functions comprising repeating the method of claim 11 until the intensity difference is less than a predetermined threshold.

* * * * *